(12) United States Patent
Gaugler et al.

(10) Patent No.: US 7,366,057 B2
(45) Date of Patent: Apr. 29, 2008

(54) CONVERTER CONTROL WITH LC FILTERING

(75) Inventors: Ulrich Gaugler, Weidenbach (DE); Horst Ziegler, Paderborn (DE); Horst Behlen, Lippspringe (DE)

(73) Assignee: Hydrometer GmbH, Ansbach (DE)

( * ) Notice: Subject to any disclaimer, the term of this patent is extended or adjusted under 35 U.S.C. 154(b) by 0 days.

(21) Appl. No.: 11/586,341

(22) Filed: Oct. 24, 2006

(65) Prior Publication Data
US 2007/0113677 A1 May 24, 2007

(30) Foreign Application Priority Data
Oct. 24, 2005 (DE) .................... 10 2005 051 119
Oct. 24, 2005 (DE) .................... 10 2005 051 160

(51) Int. Cl.
*G01F 1/66* (2006.01)
(52) U.S. Cl. .................................... 367/135
(58) Field of Classification Search ............. 367/903, 367/135, 137
See application file for complete search history.

(56) References Cited

U.S. PATENT DOCUMENTS

| 4,114,457 A |   | 9/1978 | Thun |
| 4,353,004 A | * | 10/1982 | Kleinschmidt ............ 367/903 |
| 4,434,669 A |   | 3/1984 | Roberts et al. |
| 5,087,850 A | * | 2/1992 | Suzuta .................. 310/316.01 |
| 5,198,713 A | * | 3/1993 | Suzuta .................. 310/316.01 |
| 6,203,516 B1 | * | 3/2001 | Kepley ...................... 604/22 |
| 6,584,861 B1 |   | 7/2003 | Jespersen |
| 6,947,851 B2 |   | 9/2005 | Jespersen |
| 2002/0143321 A1 | * | 10/2002 | Shibata ....................... 606/1 |
| 2007/0113677 A1 | * | 5/2007 | Gaugler et al. ......... 73/862.21 |

FOREIGN PATENT DOCUMENTS

| DE | 26 29 562 C2 | 6/1982 |
| DE | 102 53 742 B3 | 3/2004 |
| DE | 10 2004 026 556 B3 | 1/2006 |
| EP | 0 686 832 A2 | 12/1995 |
| EP | 0 762 086 A2 | 3/1997 |
| EP | 1 396 708 A2 | 3/2004 |

\* cited by examiner

*Primary Examiner*—Dan Pihulic
(74) *Attorney, Agent, or Firm*—Merchant & Gould P.C.

(57) ABSTRACT

An arrangement for signal processing in ultrasonic transducers in flow meters has an ultrasonic transducer acted upon by a drive signal with the ultrasonic transducer being connected to a resonant circuit matched to the frequency of the drive signal. The resonant circuit can be a component of the network which makes switching over the ultrasonic transducer for transmitting operation to a receiving operation possible. An ultrasonic flow meter uses time-of-flight principle for transmitting and receiving ultrasonic signals and signal post-processing of the received ultrasonic signals. To make available an ultrasonic flow meter that produces an improved quality voltage signal for evaluation and at the same time makes possible a reduction of its production costs, a ringing circuit is provided. The ringing circuit may be a series ringing circuit for signal post-processing of the received ultrasonic signals connected to a comparator and using an LC-circuit, a Pi-filter or an RLC-circuit.

23 Claims, 5 Drawing Sheets

CONVERTER CONTROL WITH LC FILTERING

BACKGROUND OF THE INVENTION

The invention relates an arrangement for driving ultrasonic transducers in flow measuring apparatuses, wherein the ultrasonic transducer is acted upon by a sinusoidal wave.

Known from DE 100 48 959 C2 is such an arrangement in which the non-inverting input of an operational amplifier is driven by a sinusoidal signal, while the inverting input can be connected optionally through a changeover switch to one of two ultrasonic transducers.

With a transducer drive consisting of digital modules, however, the problem exists that the generation of a sinusoidal signal in a digital manner is very expensive. In the driving of a transducer with a square-wave signal, on the other hand, the harmonic wave components interfere, the latter at the same time exciting the transducer and thus being carried along by the transducer, so that an adulteration of the measurement signal arises. Beyond this, the driving of such a transducer with a signal containing a DC voltage component is undesired, as is the case with short bursts, since a resting signal typically has an average value at one of the operating voltage limits and the average value of the burst signal lies between the operating voltage limits, so that here a step function response is superimposed.

The invention is based on the task of creating an arrangement for the driving of ultrasonic transducers in flow measurement apparatus, which arrangement is not only cost effective but also allows a transducer operation with only negligible measurement errors.

Preferably, according to the invention, in a driving of ultrasonic transducers from a digital module, with the aid of a resonant circuit, preferably in the form of an LC ringing circuit, both a filtering of the driving sinusoidal signal as well as a CD-voltage suppression can be achieved.

Advantageously, with the invention there is, in particular, a filtering out of the harmonic waves from the drive signal, and furthermore the suppression of DC voltage components at the transducer through parallel connection of the ringing circuit coil. In addition, the efficiency of the transfer path is improved since the capacitance of the conduction cables to the transducer as well that of the transducer itself can be taken into consideration in the calculating of the LC member. As a result of the filter effect of the LC member, the noise ratio and thus the quality of the receiver signal can be substantially improved.

The present invention further relates to—and claims in a coordinate manner—an arrangement for signal processing in an ultrasonic flow meter according to the time-of-flight principle. The distinctive feature of this embodiment of the invention consists in the fact that a network is provided for the driving of an ultrasonic transducer arrangement. The transducer arrangement includes a first ultrasonic transducer and a second ultrasonic transducer. Furthermore, switching means are provided, whereby the first and second ultrasonic transducers are optionally switchable into either a transmitting operation or a receiving operation, and the network exhibits an electrical ringing circuit that is active as a frequency filter in the transmitting as well as the receiving operation of the respective ultrasonic transducer. In addition, the above-described embodiment ensures, in the receiving operation in the respective ultrasonic transducer, an amplification of the electrical signal generated by the ultrasonic transducer.

The present invention makes possible, first, the greatest possible suppression of the number of undesired harmonic wave components of the digital square-wave signals as drive signals coming from a digital module, and, through this, the avoidance of undesired sonic wave components in the water. Furthermore, ultrasonic transducers can be operated in either transmitting mode or receiving mode, whereby the direction discrimination for the ultrasonic signal takes place in dependence on the sequence in which the two ultrasonic transducers strings are shorted out. In this, in the transmitting operation of the transducer in question, the network serves to perform, through the resonant circuit of the network, a frequency selection or a bandwidth selection, and at the same time ensures an increase of the voltage present at the comparator in comparison to the voltage of the ultrasonic transducer with simple components.

Appropriately, for the embodiment of the resonant circuit a C-member is assigned to each ultrasonic transducer and, in addition, a common L-member is provided, so that the respective C-member and the L-member form a resonant circuit, according to the switch state. Such a circuit can likewise be realized through technologically simple switching means.

Appropriately, the switching means are assigned directly to each ultrasonic transducer.

An effective reduction of losses is assured in that the network is connected via a T-circuit to the signal conductor and to an input of the comparator, that the extension of the vertical branch of the T-circuit exhibits the L-member, and that the respective transversely-running part of the T-circuit exhibits the respective C-member, the switch, and the associated ultrasonic transducer. According to the switch position, the respective C-member thus forms a series or parallel circuit with the active ultrasonic transducer. The L-member supplements the capacitances to form a resonant circuit.

For optimization, i.e. for balancing of the above-described arrangement, the network displays in addition a further C-member, which is connected in parallel to the L-member. Through this means results a greater freedom in the dimensioning of the C-member in the T-circuit.

The network is appropriately arranged in such a way that it is in resonance with the fundamental wave of a drive signal of the network via the signal conductor, in order to achieve an optimum selection effect.

According to a further embodiment of the present invention, a symmetrical voltage for the driving of the comparator is applied to the input of the comparator, whereby the total amplitude of the input voltage in comparison to the input voltage at the network is increased or doubled, as the case may be.

Specifically, the arrangement described above displays a series circuit of an additional C-member and L-member. Here, the series circuit is wired parallel to the C-member and to the L-member (the extension of the vertical branch of the T-circuit). The second input of the comparator is driven via the series circuit. The series circuit, brings about, first, a voltage amplification through impedance transformation and, second, the possibility of the conversion of the sign of the voltage in the region of the input to the comparator.

Preferably, the network is a passive network with reciprocity in respect to the transmitting operation or the receiving operation of an ultrasonic transducer.

Finally, the present invention relates to an ultrasonic flow meter according to the time-of-flight principle, with a measurement section, means for transmitting and receiving ultrasonic signals, as well as means for further signal processing of the received ultrasonic signals.

The ultrasonic waves arriving via the measurement section at the transducer are converted into electrical voltage signals. Since the operating voltage of the transducer is too low for a further evaluation of the signal, the signal voltage is raised and fed to the further signal evaluation. For the voltage raising, conventional integrated semiconductor elements are used, which exhibit various disadvantages. For one thing, they possess nonlinearities, which can disadvantageously influence the measurement result, and for another thing, besides raising the voltage signal to be evaluated, they also raise the noise level. Beyond that, such semiconductor elements are comparatively expensive. In addition, semiconductor elements are always associated with greater current consumption.

SUMMARY OF THE INVENTION

The task of the present invention is to make available an ultrasonic flow meter that makes available for evaluation a voltage signal of improved quality and that, at the same time, makes possible a reduction of its production costs.

The above task is accomplished, in the generic ultrasonic flow meter, in that a ringing circuit is provided as a means for signal post-processing of the received ultrasonic signal and that the resonant circuit is connected to a comparator or an operational amplifier. Underlying the invention is the concept of selecting a frequency region in dependence on the specific resonant frequency of the ringing circuit and of merely undertaking an amplification of that frequency region. In this way, the frequency region associated with the wanted signal is emphasized and the frequency region associated with the unwanted signal, for example the noise, is suppressed. Only the wanted signal frequency components thus selected are fed to the amplifier. Through this, the quality of the voltage signal sent forward for further signal evaluation is substantially improved in comparison to the prior art, and at the same time the switching-technology precautions for protecting the ringing circuit are less costly to realize than the semiconductor components used until now.

To implement the invention, LC (inductor, capacitor combinations) or LRC circuits (inductor, resistor, capacitor combinations) are preferably used, each of which forms a series circuit, a parallel circuit or a PI-filter, according to the wiring. The output signal can be taken in an advantageous way from both terminals of the inductor. Here arises the output voltage that has been raised through resonance. Furthermore, in this way it is assured that the same DC voltage is present at both comparator inputs.

All three circuits have specific properties with respect to voltage increase at the inductor, the resistive load through the driving voltage source, the output load and the noise band limitation. Beyond this, with all three circuits not only the actual, built-in resistances but also the loss resistances of the inductances and the capacitances must be taken into consideration.

Common to all circuits is the fact that the resonant frequency is determined and can be intentionally dimensioned through the value and configuration of the inductances and capacitances, and, to a lesser degree, through all real resistances.

BRIEF DESCRIPTION OF THE DRAWINGS

Appropriate embodiments of the present invention are detailed in the following with the aid of the drawings. In the drawings.

DETAILED DESCRIPTION OF THE PREFERRED EMBODIMENT(S)

Figure 1:
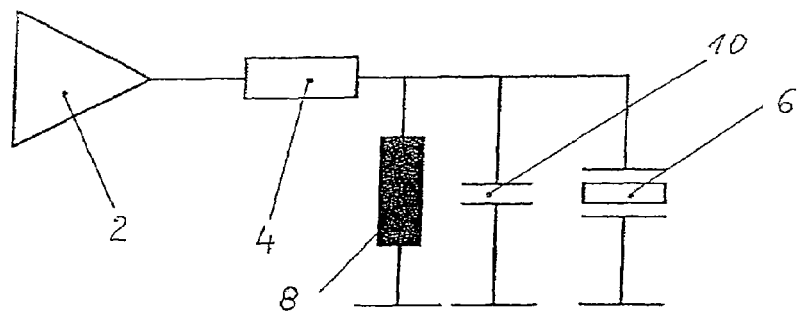
FIG. 1 shows a first embodiment example of the invention, wherein the resonant circuit connected to the ultrasonic transducer is designed as a parallel ringing circuit.

According to FIG. 1, an amplifier 2 delivers at its output a drive signal across a dropping resistor 4 to an ultrasonic transducer 6, and parallel to this ultrasonic transducer 6 lies a resonant circuit in the form of an LC-parallel ringing circuit with an inductor 8 and a capacitor 10. This ringing circuit filters out, from the signal delivered across the dropping resistor 4, a sinusoidal oscillation corresponding to the resonant frequency of the circuit, which sinusoidal oscillation then lies as a drive signal at the ultrasonic transducer 6, while harmonics of the sinusoidal signal are led away and are kept from the transducer 6. The low ohmic resistance of the coil forming the inductor 8 represents a virtual short circuit for the DC voltage components of the drive signal across the transducer 6, so that the transducer, as desired, is acted upon only by an AC signal.

Figure 2:
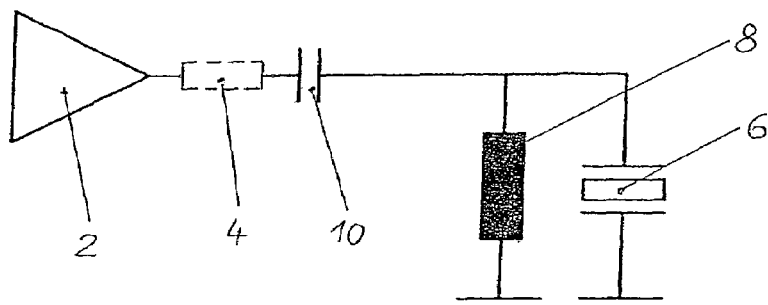
FIG. 2 shows a further embodiment example of the resonant circuit as a series ringing circuit.

In the embodiment example according to FIG. 2, the resonant circuit is designed as an LC-ringing circuit, whose inductor 8 again lies parallel to the ultrasonic transducer 6, while the capacitor 10 as well as the dropping resistor 4 lie in the input path for the drive signal. This series ringing circuit likewise filters the desired sinusoidal signal for driving the ultrasonic transducer 6 from the drive signal, while undesired harmonics are suppressed.

Figure 3:
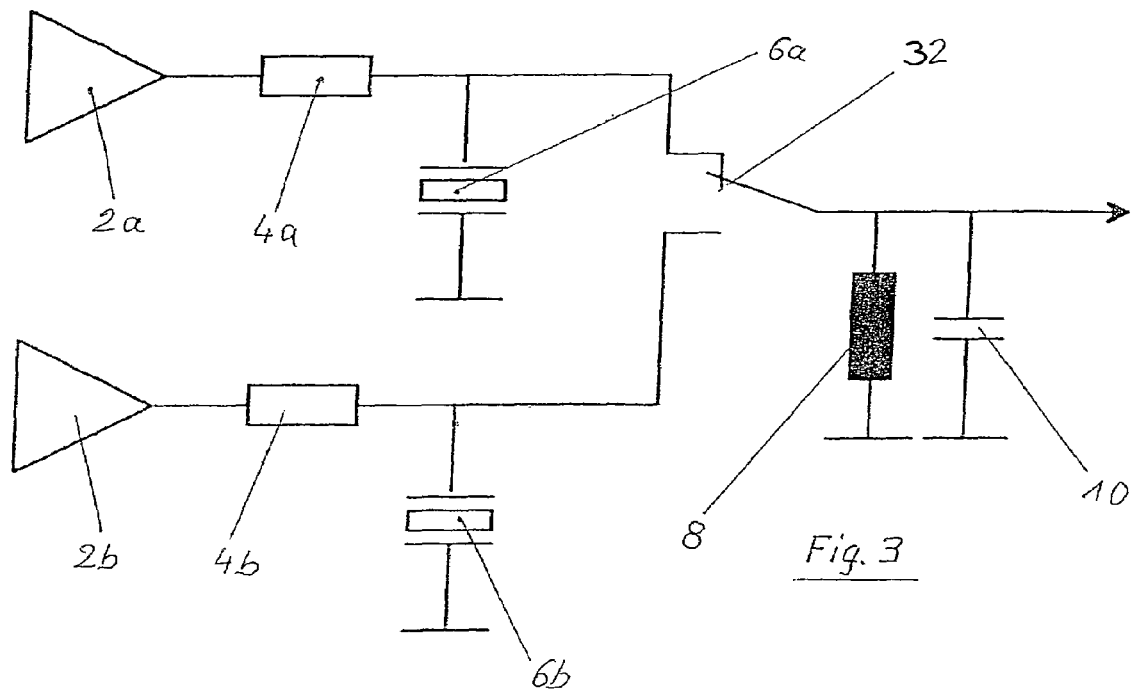
FIG. 3 shows an example of the optional connection of the resonant circuit designed as a parallel ringing circuit to, in each case, one of several ultrasonic transducers.

The embodiment example according to FIG. 3 shows a possibility for the multiple exploitation of one and the same ringing circuit 8, 10 for several ultrasonic transducers 6a and 6b with the aid of a switch 32. According to the switch position, the ringing circuit 8, 10 is connected to the transducer 6a or to the transducer 6b. In this way, one coil and one capacitor can be eliminated and at the same time the separation between the two transducers is improved. In addition, the symmetry between the two transducers is improved, since they both use the same ringing circuit.

If the amplifier 2 has an adequately high output resistance, the dropping resistor 4 can be eliminated if need be.

Figure 4:
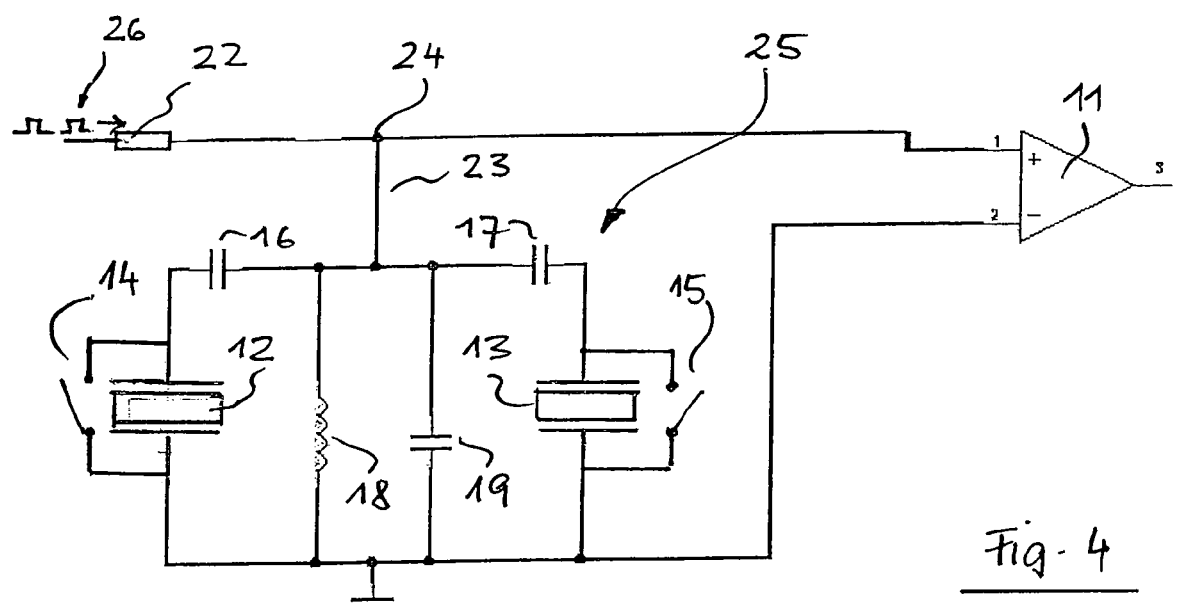
FIG. 4 shows a further embodiment example of the invention wherein a network is provided for driving the ultrasonic transducer arrangement.

FIG. 4 shows, in schematically simplified representation, an arrangement for signal processing, wherein a passive network designated by the reference numeral 25 is provided for driving of an ultrasonic transducer arrangement via a T-circuit 23. The signal conductor 26 is connected via the resistor 22 to the network 25. A digital square-wave signal is preferably fed from a signal generator (not shown) via the signal conductor 26.

The network 25 is connected to the signal conductor 26 and includes at its two branches in each case a C-member 16 or 17 in a symmetrical arrangement. Each C-member 16, 17 is connected to a transducer 12, 13. Each of the two previously described circuit lanes includes a short circuit conductor for bridging across the respective transducer 12, 13 with a switch 14, 15 situated in the lane. The circuit lanes of the C-member 16, of the transducer 12 and of the switch 14 are connected in parallel to the circuit lane of the C-member 17, of the transducer 13 and of the switch 15 in the T-shaped network 10.

Located in the extension of the vertical branch of the T-circuit 23 is another C-member 19 as well as an L-member 18, which are likewise connected in parallel inside the network 25.

The design of the arrangement according to FIG. 4 makes it possible to operate each ultrasonic transducer 12 or 13 in a transmitter operation as well as a receiver operation. The running direction of the ultrasonic signal is influenced through the fact that during the transmitting phase one of the two ultrasonic transducers 12 or 13 is shorted out through actuation of the respective switch 14 or 15.

The representation of the ultrasonic transducers are simplified representations. The ultrasonic transducers 12 or 13 include still other passive parts, which are not reproduced in the simplified representation according to FIG. 4 for reasons of clarity.

The whole network 10 in FIG. 4, including the impedances of the transducers 12 and 13, is so dimensioned that the network 10 is always in resonance with the fundamental of the digital square-wave drive signal coming over the signal conductor 26. Through this means, the harmonic portion of the square-wave signal is largely suppressed, a sinusoidal signal is achieved, and unwanted sound waves in the water are thereby avoided.

With the changeover from the transmitting phase to the receiving phase, the short circuit is changed from the ultrasonic transducer that is to receive the signal to the opposing ultrasonic transducer that is to transmit the signal. In this phase the whole network 25 is likewise in resonance with the incoming ultrasonic signal due to the special design of the arrangement according to FIG. 4.

The mechanical ultrasonic signal is first converted in the receiving ultrasonic transducer into an electrical voltage, which feeds into the network 25. The electrical signal is amplified through a resonance transformation of the whole network 25 and fed to the tap point 24 of the T-circuit 23 and thus to an input of the comparator 11. The other input of the comparator 11 is connected to a reference voltage. In this case, the output signal from the network 25 is in an asymmetrical mode.

Depending which lane of the network 10 is short-circuited, the ultrasonic transducer 12 or 13 active at a given time, including its associated C-member 16 or 17, is in a circuit parallel to the C-member 19, to the L-member 18 and to the short-circuited lane of the network 10 including the other C-member 16 of 17.

Figure 5:
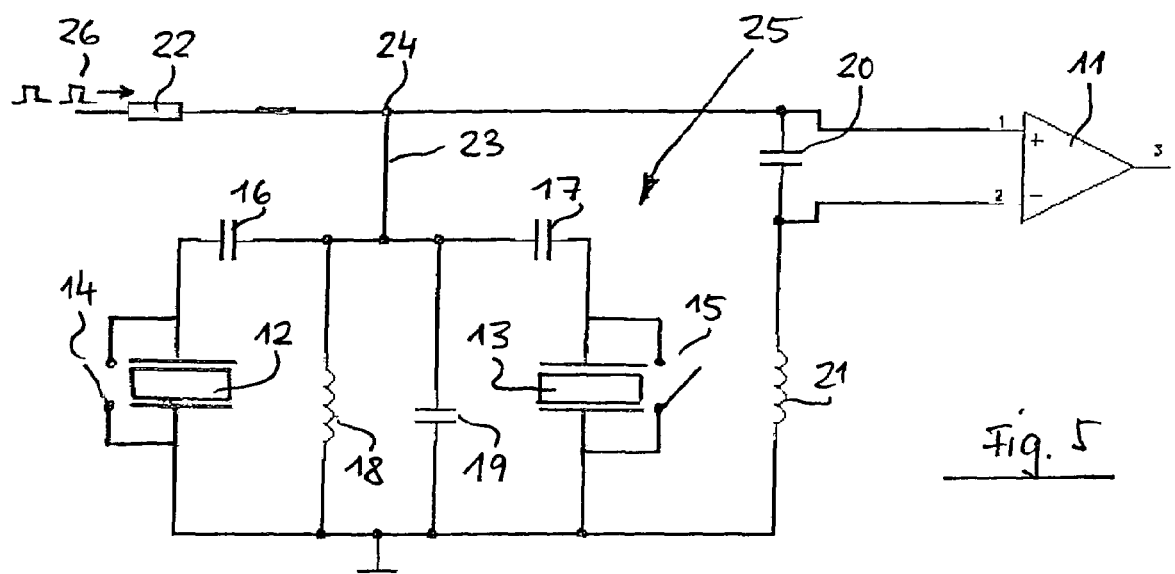
FIG. 5 shows a further development of the embodiment example of the invention according to FIG. 4, wherein an additional series circuit of a C-member and a L-member is provided in the drive region of the comparator.

The design according to FIG. 5 is extended in comparison to the embodiment according to FIG. 4 in that the second input of the comparator 11 is driven via a series circuit consisting of a C-member 20 as well as an L-member 21, which series circuit is connected in parallel to the T-member 23. Here too, the network 25 including the impedances of the first ultrasonic transducer 12, of the second ultrasonic transducer 13 as well as the series circuit consisting of C-member 20 and L-member 21, is so dimensioned that the network 25 is always in resonance with the fundamental of the digital square-wave drive signal.

The series circuit of the C-member 20 and the L-member 21 is, as such, not matched to the ultrasonic frequency. It forms rather, in dependence on the dimensioning, an inductance and a capacitance that form the common lateral branch of the network 10, in parallel to the L-member 18 and the C-member 19 of the network 25. In this configuration, the series circuit of the C-member 20 and the L-member 21 has, first, the property of a voltage amplifier through impedance transformation, and, in addition, the property of converting the sign of the voltage at the output of the comparator 11.

It is possible, through appropriate dimensioning of the C-member and the L-member, to generate a symmetrical voltage between the inputs of the comparator 11 for driving the comparator 11, and, at the same time, to double the total amplitude of the input voltage at the comparator 11 without active amplification, i.e. merely with passive elements.

In both circuit arrangements of FIG. 4 and FIG. 5, the network 25 forms a frequency filter in both the receiving mode and the transmitting mode, i.e. a band pass filter that is matched to the ultrasonic frequency. Through this means, external noise and disturbing influences can be filtered out. At the same time, a reciprocity of the arrangement is assured through use of the T-member 23 and the symmetric arrangement of the network 25.

In the description of the individual circuits according to the following embodiment examples, the inductors are indicated by Ln, the capacitors by Cn and the resistors by Rn.

Figure 6:
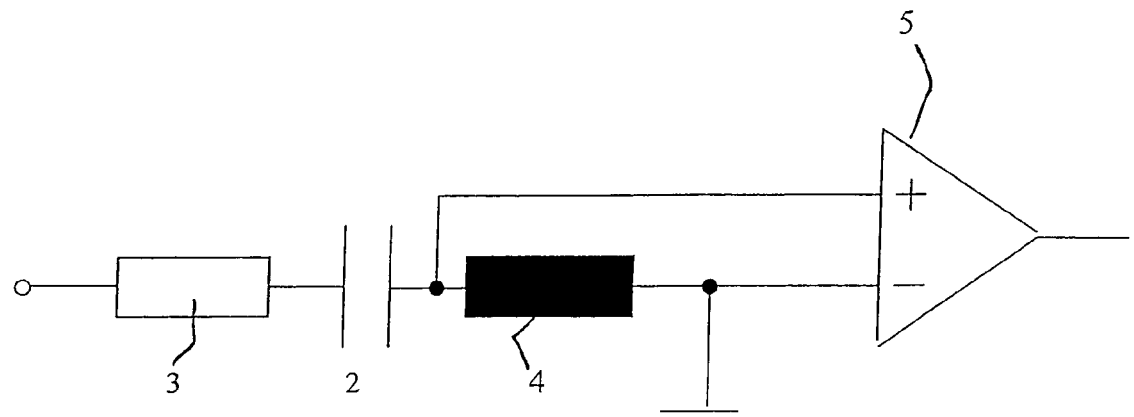
FIG. 6 shows a design of a series ringing circuit for implementing the voltage increase according to the present invention.

FIG. 6 shows a series ringing circuit 1. Here, the DC input voltage of the comparator is referenced to ground potential, and the series circuit consists of the resistor 3 (R1), the C-member 2 (C1), the L-member 4 (L1) and the internal resistance Ri (not shown in FIG. 1) of the driving voltage source. The voltage rise at the L-member 4 results as a quotient from $w0 \cdot L1/Rges$. The abbreviation $w0$ is the resonant frequency of the circuit multiplied by $2 \cdot PI$, Rges is the sum of $R1+Ri+Rv$, where Rv represents the loss resistance of C1 and L1, which is transformed into one series resistance R1.

Figure 7:
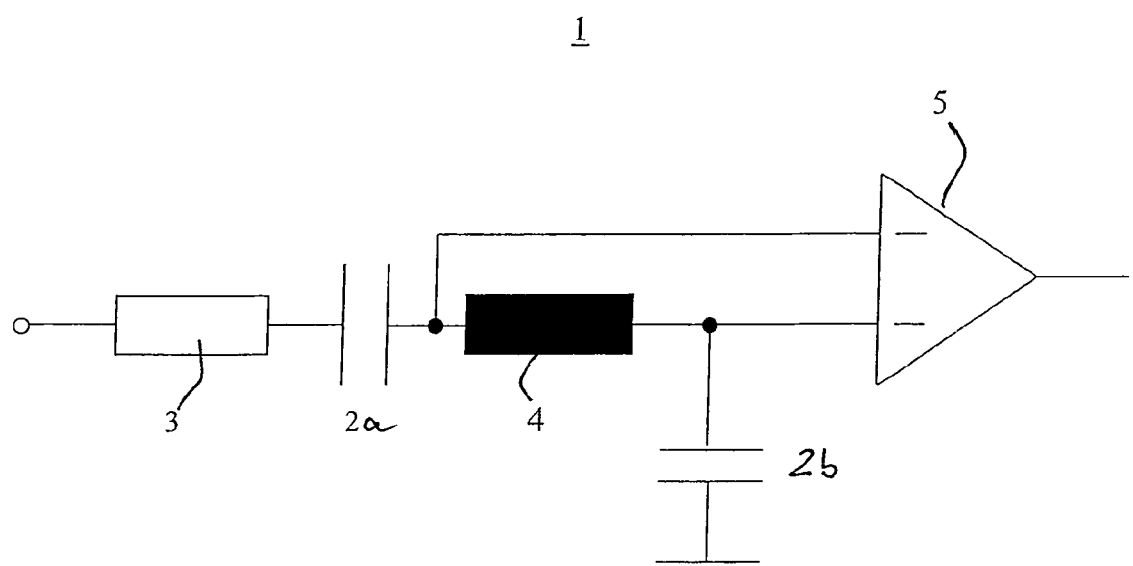
FIG. 7 shows a further design of a series ringing circuit for implementing the voltage increase of according to the present invention.

FIG. 7 is similar in principle to the circuit in FIG. 6, with the property that here the DC potential of the comparator inputs can be chosen independently of the ground potential. Here, the series circuit of the two C-members (C2*a* and C2*b*) is frequency matched.

In reference to the noise suppression, the circuits according to FIG. 6 and FIG. 7 do not have the property of a band pass filter but rather a high-pass filter, since above the resonant frequency the positive comparator input is always coupled more strongly to the driving voltage source and the negative input lies practically at ground potential. Thus, above the resonant frequency these circuits have no broad rejection and have as a noise bandwidth an integral above a high pass.

Figure 8:
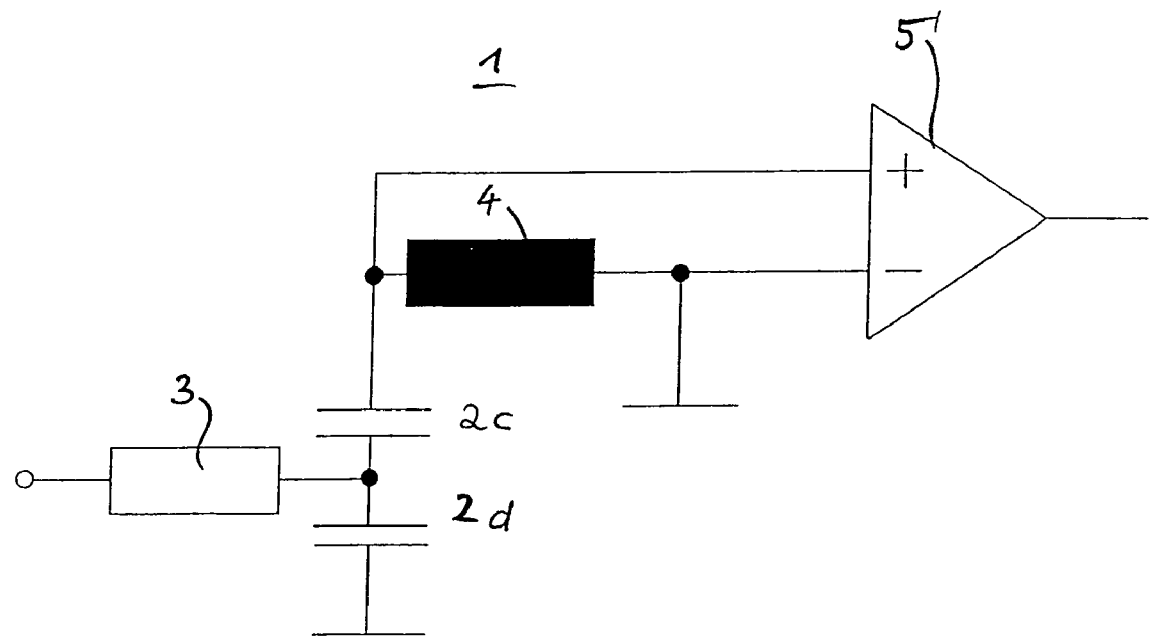
FIG. 8 shows a design of a parallel circuit for implementing the voltage increase according to the present invention.

FIG. 8 shows a parallel circuit that becomes a resonant transformer through the two C-members 2*c* and 2*d*. The DC input potential at the comparator 5, like the L-member 4 (L3), is placed at ground potential. The outputs are again applied to the terminals connections of the L-member 4 (L3). The driving voltage source (not shown) with its internal resistance Ri is connected via the resistor 3 (R3) to the connection of 2*c* and 2*d*.

Here, once again, all the loss resistances must be taken into consideration. Appropriately, they should be converted to an equivalent resistance Rp parallel to L3. With the dimensioning of the resistor 3 R3 with a known internal resistance Ri and known Rp and the relationship of C-members 2c to 2d, a resonant frequency transformation can be undertaken that is adjustable within broad limits. The raised voltage appears here appropriately at the L-member 4 (L3). Finally, the parallel circuit can also be fed by a current generator. In that case, the voltage at the L-member 4 (L3) is a product of the feeding current multiplied by the resonant reactance. In the case of current feeding, R3 is omitted and 2c with 2d are simplified into a single C-member functionality.

Regarding the noise suppression, the parallel circuit is superior, since here through the parallel circuit of L3 and 2c/2d a genuine pass band arises with the resonant frequency at a maximum, thus the reproduction of the reactance. The noise bandwidth arises here from the integral above this reproduction. The parallel circuit thus has a broad rejection above and below the resonant frequency and thus a far smaller noise bandwidth.

Figure 9:
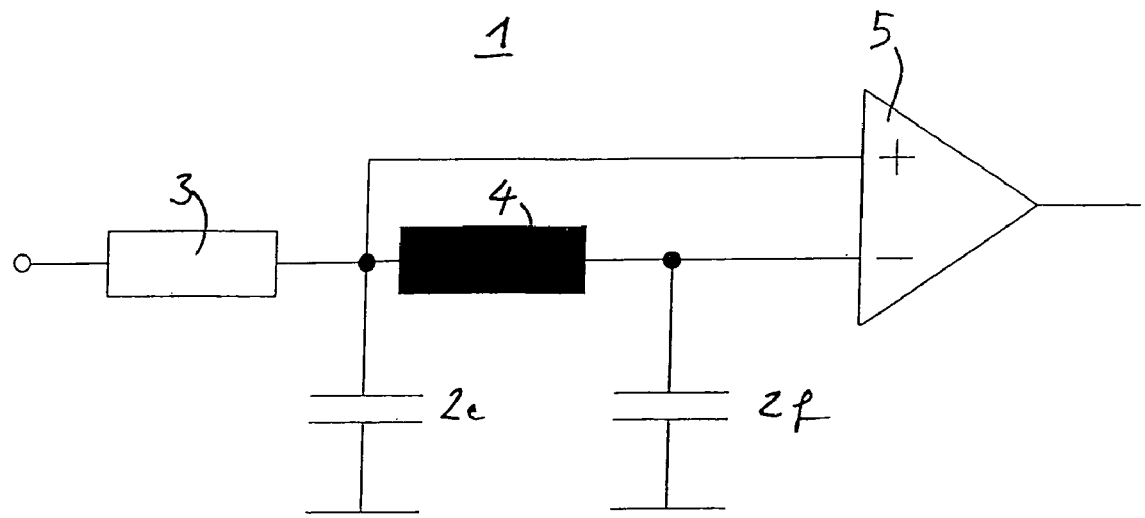
FIG. 9 shows a design of a Pi-filter for implementing the voltage increase according to the present invention.

Finally, FIG. 9 shows the Pi-filter. Here the circuit is conceived in such a way that the same DC input potential is used at the comparator as the DC potential of the driving voltage source, the latter being connected via the resistor 3 (R4) to the L-member 4 (L4) and the C-member 2 (2e). The output here is appropriately connected to the terminals of L4. The Pi-circuit has an especially useful property. The raised voltage at the connection L4/2e is out of phase with respect to the voltage at the connection L4/2f. In principle, both comparator inputs, with the input of a suitable DC potential, can now utilize the whole allowed input swing of the comparators, whereby, through the large total voltage increase, additional noise diminution then occurs. The two voltages at the C-members 2 (2e and 2f) can, however, be differently dimensioned in their amplitude in an intentional manner, the ratio 2e to 2f here being crucial. The resonant frequency transformation is to be dimensioned equivalent to the circuit in FIG. 8.

With regard to the noise suppression, the same properties are present here as with the parallel circuit of FIG. 8.

For exact analysis and dimensioning of all possible circuits, it is appropriate to use complex four-pole theory. Thus all factors, such as frequency response, phase response, matching resistances and voltage courses, in all components are to be described exhaustively and are to be utilized for a desired dimensioning.

It is to be noted that combinations among themselves of the above described inventions are also expressly included in the disclosure content of this application.

The invention claimed is:

1. Arrangement for driving ultrasonic transducers in flow meter apparatuses, comprising a digital module generating a square wave signal for driving at least one ultrasonic transducer, wherein the ultrasonic transducer is connected to a resonant circuit matched to the frequency of a sinusoidal signal, said resonant circuit is provided between said digital module and said ultrasonic transducer, such that by filtering and direct current voltage suppression of the square wave signal, said ultrasonic transducer is acted upon by the sinusoidal signal.

2. Arrangement according to claim 1, wherein the resonant circuit is formed through an LC-ringing circuit, to the inductor of which the ultrasonic transducer is connected in parallel.

3. Arrangement according to claim 2, wherein the ringing circuit is configured as a parallel ringing circuit, to which the ultrasonic transducer lies in parallel.

4. Arrangement according to claim 2, wherein the ringing circuit is configured as a series ringing circuit, to the inductor of which the ultrasonic transducer lies in parallel, and the capacitor of which lies in the input lead to the drive circuit.

5. Arrangement according to claim 1, further comprising a resistor arranged in the input lead to the drive circuit.

6. Arrangement according to claim 1, further comprising a plurality of separately-driven ultrasonic transducers, which can be connected optionally via a change-over switch to one and the same ringing circuit.

7. Arrangement for signal processing in an ultrasonic flow meter according to the time-of-flight principle, comprising: a network for driving a transducer arrangement, wherein the transducer arrangement includes a first ultrasonic transducer and a second ultrasonic transducer, and wherein switching means are provided, by means of which the first and second ultrasonic transducers are optionally switchable either into a transmitting operation or a receiving operation, and wherein the network includes an electrical ringing circuit that, in the transmitting operation as well as in the receiving operation of the respective ultrasonic transducer, acts as a frequency filter.

8. Arrangement according to claim 7, wherein assigned to each ultrasonic transducer in the network is a C-member and, in addition, an L-member is provided, which, together with the C-member, forms a ringing circuit according to the switch state.

9. Arrangement according to claim 7, wherein assigned to each ultrasonic transducer is its own switch means.

10. Arrangement according to claim 7, wherein the network is connected via a T-circuit to a signal lead and to one input of a comparator, an extension of the vertical branch of the T-circuit includes an L-member, and the respective transverse-running part of the T-circuit includes a C-member, the switch, as well as the associated ultrasonic transducer.

11. Arrangement according to claim 10, wherein in addition to the network a further C-member is provided, which is connected in parallel to the L-member.

12. Arrangement according to claim 7, wherein the network is configured in such a way that it is in resonance with the fundamental wave of a drive signal of the network from a signal lead.

13. Arrangement according to claim 7, wherein the arrangement is so dimensioned that for the driving of a comparator a symmetrical voltage is applied to the inputs of the comparator and the total amplitude of the input voltages at the comparator is increased, preferably doubled, in comparison to the input voltage at the network.

14. Arrangement according to claim 7, wherein a series circuit of another C-member and another L-member is provided, which series circuit is connected in parallel to the C-member and the L-member, and the second input of a comparator is driven via the series circuit.

15. Ultrasonic flow meter according to the time-of-flight principle with a measurement segment, comprising means for transmitting and receiving ultrasonic signals, as well as means for signal post-processing of the received ultrasonic signals, wherein a ringing circuit is provided for signal post-processing of the received ultrasonic signals, and the ringing circuit is connected to a comparator.

16. Ultrasonic flow meter according to claim 15, wherein the ringing circuit is a series ringing circuit.

17. Ultrasonic flow meter according to claim 15, wherein the ringing circuit is a parallel ringing circuit.

18. Arrangement according to claim 1, wherein a ringing circuit includes a Pi-filter.

19. Arrangement according to claim 1, wherein a ringing circuit includes an LC- or RLC-circuit.

20. Arrangement according to claim 19, wherein the drive voltage is applied to one end of the L-member.

21. Arrangement according to claim 1, wherein a DC bias voltage is applied to one end of an L-member.

22. Arrangement according to claim 1, wherein the resonant frequency of a ringing circuit is changed by circuit analysis and/or dimensioning of the components.

23. Arrangement according to claim 22, wherein additional C-members are connected for changing the resonant frequency of the ringing circuit.

* * * * *